United States Patent
Bilat et al.

(10) Patent No.: US 8,427,095 B2
(45) Date of Patent: Apr. 23, 2013

(54) ACTUATION SYSTEM WITH STEP MOTOR

(75) Inventors: Stéphane Bilat, La Chaux-de-Fonds (CH); Georges Gerber, Tramelan (CH)

(73) Assignee: Societe Industrielle de Sonceboz S.A., Sonceboz (CH)

( * ) Notice: Subject to any disclaimer, the term of this patent is extended or adjusted under 35 U.S.C. 154(b) by 245 days.

(21) Appl. No.: 13/031,018

(22) Filed: Feb. 18, 2011

(65) Prior Publication Data

US 2011/0298412 A1 Dec. 8, 2011

(30) Foreign Application Priority Data

Feb. 18, 2010 (EP) .................................. 10153946

(51) Int. Cl.
*H02P 8/00* (2006.01)
(52) U.S. Cl.
USPC .......... 318/696; 318/254.1; 318/685; 318/459
(58) Field of Classification Search .................. 318/685, 318/695, 696, 254.1, 671, 672, 459, 470, 318/475
See application file for complete search history.

(56) References Cited

U.S. PATENT DOCUMENTS

| | | | |
|---|---|---|---|
| 4,480,218 A * | 10/1984 | Hair | 318/696 |
| 5,262,708 A | 11/1993 | Metzger | |
| 6,262,554 B1 | 7/2001 | Kojima et al. | |
| 6,864,647 B2 * | 3/2005 | Duncan et al. | 318/114 |
| 7,116,070 B2 * | 10/2006 | MacKay | 318/400.11 |
| 7,170,254 B2 * | 1/2007 | Yamada | 318/696 |
| 7,911,174 B1 * | 3/2011 | Howard et al. | 318/685 |
| 2009/0153093 A1 | 6/2009 | Pinewski et al. | |

FOREIGN PATENT DOCUMENTS

EP       1 760 875 A1    3/2007

* cited by examiner

*Primary Examiner* — Bentsu Ro
*Assistant Examiner* — Thai Dinh
(74) *Attorney, Agent, or Firm* — Faegre Baker Daniels LLP

(57) ABSTRACT

The actuation system including a control system, an actuator comprising a drive part and a step motor comprising a rotor and a stator with at least one electric phase, an actuated system comprising a controlled element coupled to the drive part, and an elastic part capable of generating an elastic return force on the rotor of the motor or on the drive part. The control system comprises means for measuring an induced electric parameter on the phase of the stator after switching off the current of said at least one phase of the stator to detect a return of the rotor resulting from elastic return force when a mechanical clearance is overtaken.

17 Claims, 8 Drawing Sheets

ACTUATION SYSTEM WITH STEP MOTOR

The present invention relates to an actuation system comprising a step motor coupled to an actuation system, comprising a controlled element with an elastic return.

Actuation systems comprising a step motor are used in numerous applications to actuate controlled elements. One of these applications is the control of a hydraulic valve, the step motor being coupled to a piston of the valve. Displacement of the piston controls opening and respectively closing of the valve. To achieve the required precision of the actuation system, the coupling between the step motor and the controlled element must have a well-defined clearance, requiring a high degree of precision in production and assembly of the system. Production costs rise as a consequence. Problems also occur during use of the system, due to wear, thermal effects and ageing of the components which reduce precision and reliability of the actuation system.

There is ongoing need to make systems which are more reliable and economic.

An aim of the invention is to provide a reliable, economic and precise actuation system, in particular which enables precise positioning of a controlled element.

It is advantageous to provide an actuation system which remains precise throughout its service life, despite wear and thermal effects.

It is advantageous to provide an actuation system which allows reduction in production and assembly costs of its components.

It is advantageous to provide an actuation system which is precise and reliable over a wide temperature range.

It is advantageous to optimise quality during production of actuation systems, especially to decrease faults during mass production, by allowing larger production tolerances.

It is advantageous to provide a reliable, economic and precise actuation system for hydraulic valves, in particular to precisely position a valve piston.

In the present invention, an actuation system includes a control system, an actuator comprising a drive part, and a step motor comprising a rotor and a stator with at least one electric phase, an actuated system comprising a controlled element coupled to the drive part, and an elastic part capable of generating an elastic return force on the rotor of the motor or on the drive part. The control system comprises means for measuring an induced electric parameter (such as voltage, current, power) on said at least one phase of the stator after switching off the current of said at least one phase of the stator to detect a return of the rotor resulting from the elastic return force when a mechanical clearance or play is overtaken.

The control system is configured to control the actuation system and comprises an electronic circuit for acquisition of the induced signal of the step motor. The control system utilises a process for detection of the clearance or play of the actuation system, called the dead zone, by measuring the induced signal when the step motor recoils under the effect of the elastic return force.

The control system may comprise a microcontroller, step motor phase, power circuits, and an induced electric parameter acquisition circuit.

The acquisition circuit may advantageously comprise a differential amplifier connected to the terminals of each phase, and overvoltage protection diodes protecting the inputs of the differential amplifier against overvoltage coming from step motor phase power circuits during control of the step motor.

The acquisition circuit may have a set of resistors for defining gain of the induced voltage on at least one phase, and offsetting of the point 0 to conduct measuring in a single polarity, irrespective of the polarity of the induced voltage.

In an embodiment, the actuation system is a hydraulic control, the actuated system being a hydraulic valve device and the controlled element being a valve piston.

Depending on the application, the drive part may comprise a reducer, and also depending on the application, a motion transformer, for example of rotary movement to linear movement.

Objects of the invention are also realised by a control process of an actuation system for detection of the mechanical clearance or play as set forth in claim 1.

In the present invention, a control process of an actuation system including a control system, an actuator comprising a drive part and a step motor comprising a rotor and a stator with at least one electric phase, an actuated system comprising a controlled element coupled to the drive part, and an elastic part generating an elastic return force on the rotor of the motor or on the drive part, comprises the steps of: (a) displacement of the rotor by a predetermined amplitude $x_i$ in a direction for displacement of the controlled element, (b) switching off the current of said at least one phase of the stator, and (c) measuring an induced electric parameter on said at least one generated phase of the stator.

When the value of the electric parameter signals that the rotor has made no return or a return inferior to a predetermined or measurable threshold, a step (d) may optionally be conducted for displacing the rotor by an amplitude $y_i$ in an opposite direction to the direction for displacement of the controlled element, where $x_i > y_i$. Within the scope of the invention, it is also possible to advance the rotor by steps, without making any return movement between steps.

Steps (a), (b), (c) and if needed (d) are repeated until an induced electric parameter is detected, corresponding to a return of the rotor resulting from the elastic return force when the mechanical clearance has been overtaken.

In an embodiment, the stator has at least two electric phases and measuring the induced electric parameter can advantageously comprise differential measurement of the electric parameter between said at least two phases. This helps determine inter alia the angle of rotation of return of the rotor to determine the clearance very precisely.

In another variant, measuring the electric induced parameter can comprise measuring the induced electric parameter of said at least one phase relative to a reference parameter, such as ground.

The induced electric parameter measured may advantageously be, or comprise, induced voltage.

The displacement amplitude $y_i$ of the rotor in the opposite direction must be less than the displacement amplitude $x_i$ of the rotor in the direction for displacement of the controlled element, preferably between 10 and 90%.

The displacement amplitude $x_i$ of the rotor in the direction for displacement of the controlled element can have a value between a tenth pitch (⅒ pitch) and two and a half pitch (2½ pitch) of the step motor, preferably a value between a quarter pitch (¼ pitch) and two pitch (2 pitch) or even between one pitch and seven quarters of a pitch of the step motor.

Other objects and advantageous aspects of the invention will be apparent from the claims, the following detailed description and the attached figures, in which:

Figure 1:
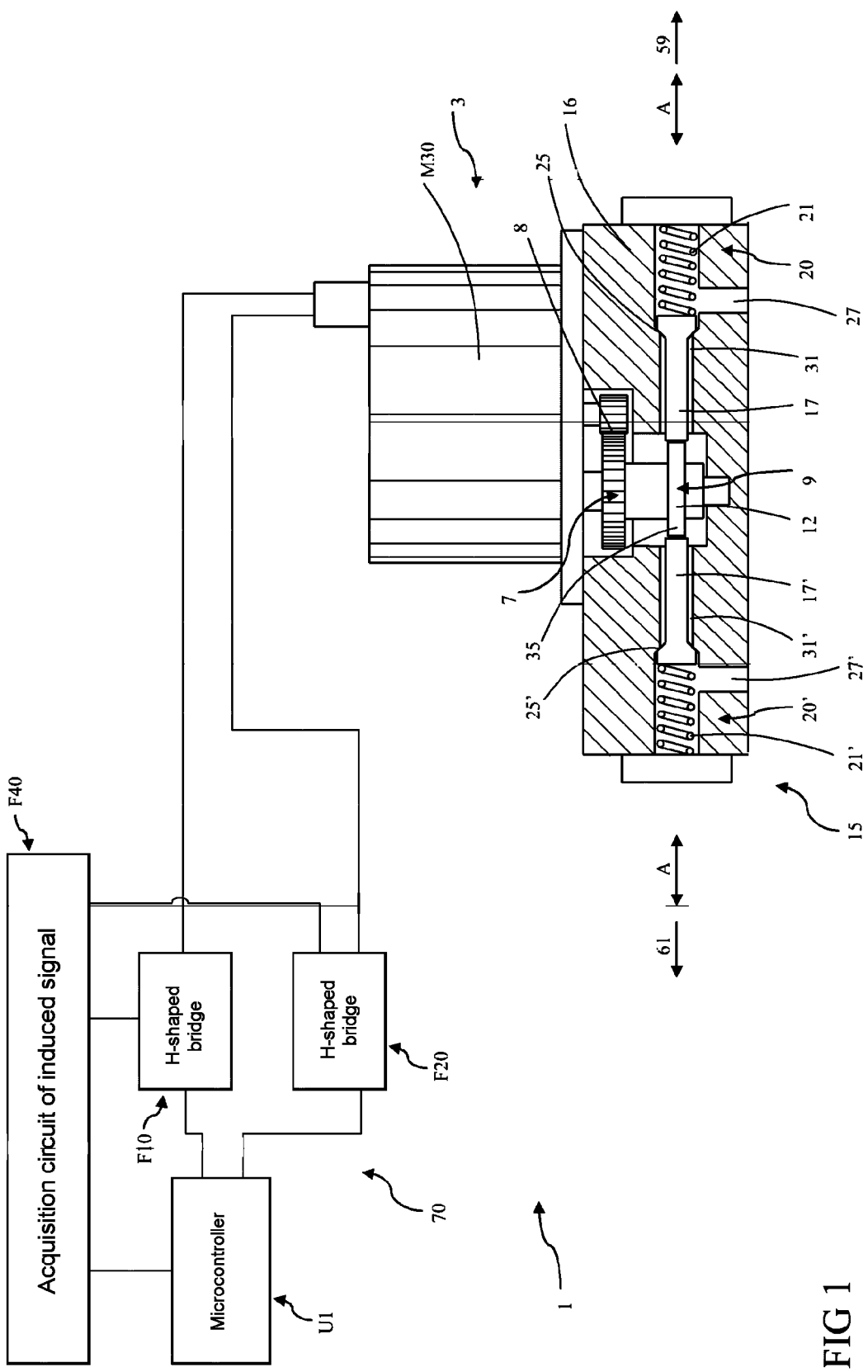
FIG. 1 illustrates an actuation system of a hydraulic valve according to an embodiment of the invention.

With reference to the figures, especially FIGS. 1, 2a, 2b and 3, an actuation system 1 according to an embodiment of the invention comprises an actuator 3 with, or connected to, a control system 70, coupled to an actuated system 15 comprising a controlled element 17, 17' on which an elastic return force acts. The actuator 3 comprises a step motor M30 and a drive part 7 powered by the rotor of the motor and coupled to the element to be displaced 17, 17' of the actuated system 15. The drive part may, according to the application, comprise a reducer 8, and also according to the application a motion transformer 9, for example of rotary to linear movement.

In the embodiment illustrated, the actuation system is a hydraulic control, the actuated system being a hydraulic valve device 15 where the controlled element is one or more pistons 17, 17' mounted in a hydraulic block 16, and the drive part comprises a motion transformer in the form of a cam 12 moving the pistons 17, 17'. In the example illustrated, the hydraulic valve comprises two valve portions 20, 20' placed on either side of the drive part 7, each valve portion comprising a piston 17, 17', an elastic element 21, a piston seat 25, an input chamber 27, and an output chamber 31. The reducer 8 increases the control precision of the opening of the hydraulic valve 15 as a function of the value of the reduction ratio of the reducer.

The control system 70 is configured for control of the actuation system and comprises an electronic circuit for detection of the clearance of the actuation system. In the embodiment illustrated, the control system comprises a microcontroller U1, one or more power circuits of step motor phases F10, F20, and an acquisition circuit F40 of induced signal. The induced signal is an electric parameter, such as current, voltage, dephasing between current and voltage, and power.

When the hydraulic valve 20, 20' is closed, the elastic element 21, 21', for example a helicoidal spring, pushes the piston 17, 17' against the piston seat 25, 25', creating a hydraulic sealing between the input chamber 27, 27' and the outlet chamber 31, 31'. When the hydraulic valve is in the closed position, there is mechanical clearance (play) between the piston 17, 17' and the cam 12. Starting out from the closed position, when the cam turns in an initial direction of rotation (arbitrarily called the "positive" direction) for displacement of the piston 17, the cam first adjusts the mechanical clearance, and then the cam pushes on the piston 17 and the piston performs a positive movement 59 in the direction of its main axis A, opening up a space between the piston 17 and the piston seat 25. The opening of the hydraulic valve enables communication between the input chamber 27 and the outlet chamber 31. Starting out from the closed position, when the cam turns in a second opposite direction the initial direction of rotation (arbitrarily called the "negative" direction), for displacement of the piston 17', the cam first takes up the mechanical clearance or play, and then the cam pushes on the piston 17' and the piston performs a negative movement 61 in the direction of its main axis A', opening up a space between the piston 17' and the piston seat 25'. The opening of the hydraulic valve 20' enables communication between the input chamber 27' and the outlet chamber 31'.

To ensure complete closing of the hydraulic valve, some mechanical clearance or play between the piston and the cam can be provided when the hydraulic valve is in the closed position. Clearance can also be the result of mechanical clearances between components in the drive chain between the rotor of the actuator and the element to be moved, these clearances dependent inter alia on the manufacturing precision of the components and the assembly needs of the components. The mechanical clearance or play in the drive chain can also vary as a function of thermal effects (operating temperature) and wear and ageing of components. These clearances influence the precision of the actuation system, and especially the positioning precision of the element to be moved. The necessity for ensuring specific precision increases production costs of components and assembly costs. Also, the loss of precision due to wear or variation in precision as a function of thermal effects can reduce the service life of the actuation system or make it less reliable. The present invention aims to eliminate or reduce the effects of these clearances in the drive chain in order to make the actuation system more reliable, effective and economic or to decrease faults during mass production. In some actuation systems, the aim is to either eliminate the clearance or play in the drive chain or control well defined clearance or play. The clearance or play in a drive chain is above all seen when there is a change of direction or when the element to be moved is displaced from a stop or rest position to another position. This clearance is sometimes called "dead zone".

In the embodiment illustrated, the hydraulic valve is of proportional type, and precise control of displacement of the piston is advantageous to ensure precise operation of the actuation system.

In the embodiment illustrated, the mechanical clearance between the cam 12 and the surface of cam 35 of the pistons 17, 17' results both from the production and assembly tolerances of the actuation system and also from defined clearance to ensure that the pistons 17, 17' rest against the seats 25, 25' when the hydraulic valve is in the closed position.

Figure 2A:
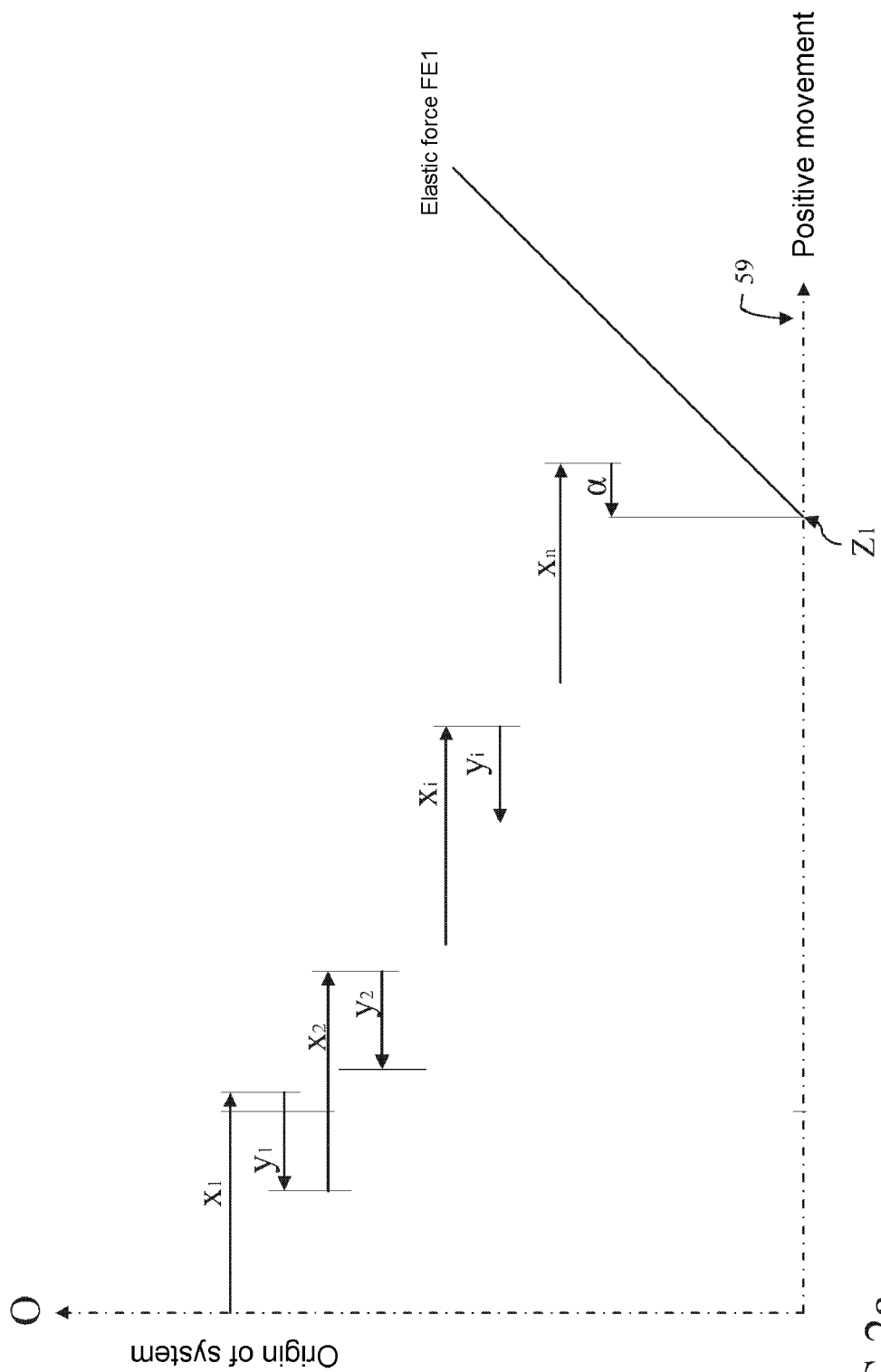
FIGS. 2a and 2b are graphics illustrating steps of a detection process of the dead zone of an actuation system according to embodiments of the invention.
Figure 2B:
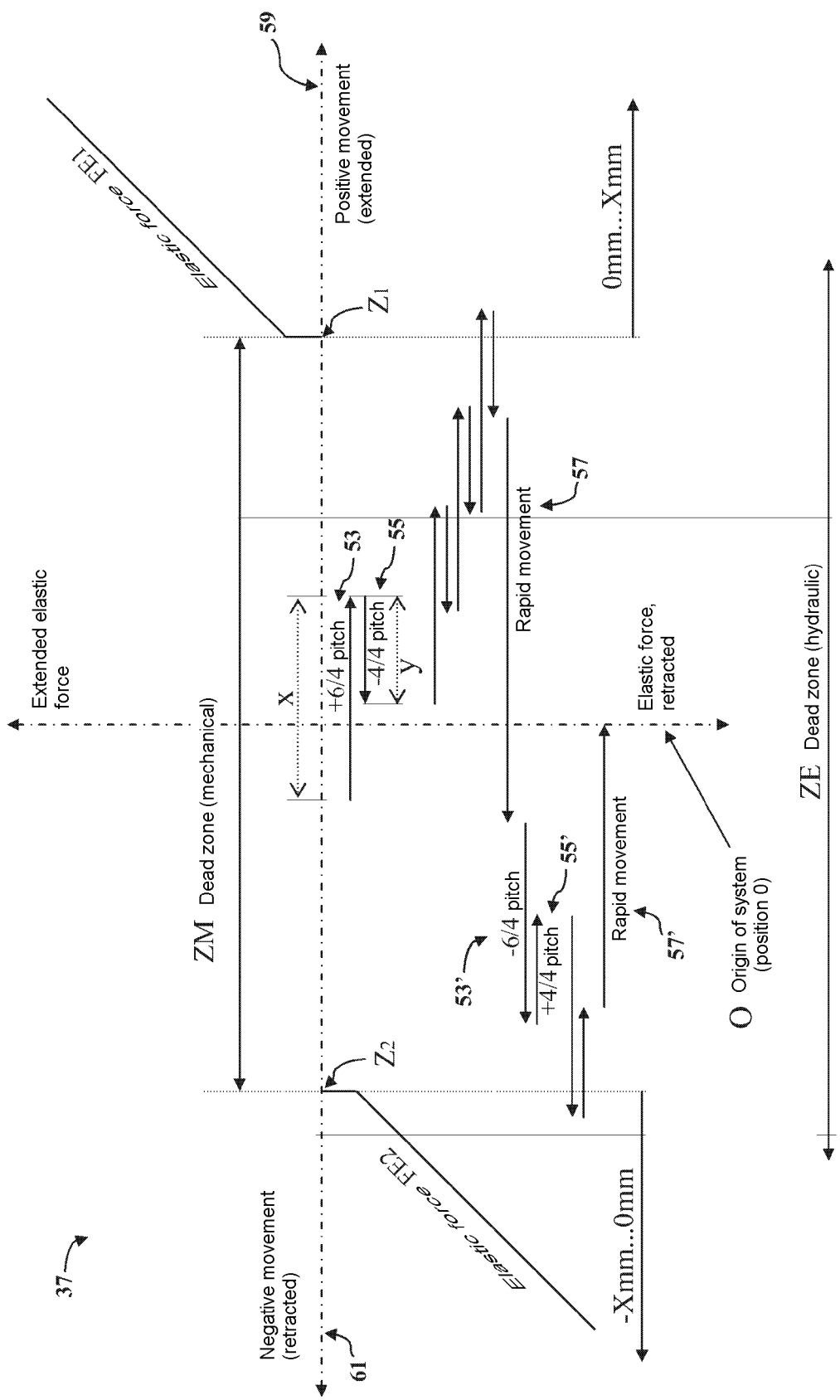

With reference to FIGS. 1, 2a and 2b, according to an embodiment with an actuated system comprising a single controlled element, the detection process of the dead zone starts with the control system controlling the step motor M30 to rotate by amplitude $x_1$ to achieve movement of the drive part 7, especially of the surface of the cam 12 corresponding to a positive movement 59 in the direction of the controlled element 17 and then the current in the phase or the phases of the step motor is cut (switched off). It is possible that the actuated system is positioned at a well-defined stop or start position, or in any position in the dead zone. The starting point forms the origin of the system O in this example. When the current is cut in the phases of the step motor, if the cam of the drive part is in contact with the controlled element 17 and if it has compressed the elastic element 21 during rotation by amplitude $x_1$, the step motor is pushed back in the inverse direction by the elastic force FE1 and induced voltage appears on the phases of the step motor. The control system 70 measures the voltage on the phases of the step motor to detect whether induced voltage has been generated. In the event where the drive part is not yet in contact with the controlled element or the clearance in the drive chain is not yet overtaken, the rotor of the step motor is not pushed back and no induced voltage appears. In this case, the control system powers the step motor to rotate by amplitude $y_1$ in the opposite direction to achieve movement of the drive part in the inverse direction of the positive movement 59. Rotation by amplitude $y_1$ is less than rotation by amplitude $x_1$, to achieve relative effective advancement of the drive part in the direction of positive movement. The step motor is again powered to carry out a second rotation by amplitude $x_2$ of the step motor, and again the control system verifies whether induced voltage has been detected, and if this is still not the case then the control system controls the step motor to execute rotation by amplitude $y_2$. The step motor continues to make forward and back moves $x_i$ respectively $y_i$, the drive part advancing towards the controlled element until detection of induced voltage after the nth forward displacement of amplitude $x_n$. The control system 70 measures the induced signal, for example the induced voltage, on one or more phases of the motor, and determines as a function of the signal the point Z1 of actuation of the controlled element 17. In a variant, the control system 70 measures the induced signal over several phases of the motor and determines the angle α of recoil of the step motor to determine the start point Z1 of actuation of the controlled element 17 with more precision.

In an embodiment, the advancement rotation of amplitude $x_i$ may have a value between a tenth pitch (⅒ pitch) and two and a half pitch (2½ pitch) of the step motor. According to a variant, the advancement rotation of amplitude $x_i$ can advantageously have a value between a quarter of a pitch (¼ pitch) and two pitch (2 pitch) of the step motor, or even a value between one pitch and seven quarters of a pitch (1 pitch and 1¾ pitch) of the step motor.

The rotation of recoil of amplitude $y_i$ may have a value between 10% and 90% of the advancement rotation of amplitude $x_i$. According to a variant, the rotation of recoil of amplitude $y_i$ may advantageously have a value between 20% and 80% of the advancement rotation of amplitude $x_i$, or again a value between 30% and 70% of the advancement rotation of amplitude $x_i$.

There is not necessarily equivalence between the amplitudes $x_i$ and $x_{i+1}$ and also there is not necessarily equivalence between the amplitudes $y_i$ and $y_{i+1}$, even though in some embodiments of the invention the advancement amplitude $x_i$, $x_{i+1}$, ... $x_n$ may be of constant value and the amplitude of recoil $y_i$, $y_{i+1}$, ... $y_n$ may also be of constant value. The angles of rotation of amplitude $x_i$ and $y_i$ can be configured according to the technical characteristics of the actuation system, in particular of the step motor, of its drive part, of the actuated system and its elastic element, and of the control system, especially the sensitivity of its acquisition circuit of induced voltage.

Within the scope of the invention, the control system 70 can be configured to measure electric parameters other than induced voltage (e.g. current, phase, power) resulting from the energy induced by recoil of the rotor of the step motor after switching off the current.

With reference to FIGS. 1, 2a and 2b, according to an embodiment with two proportional hydraulic valves 20 and 20', the process of detection of the dead zone in this specific example starts with the step motor M30 effecting rotation 53 of amplitude x to move the surface of the cam 12 in the direction of the hydraulic valve 20, corresponding to advancement movement 59, and then the current in the phases of the step motor is cut. When the current is cut in the phases of the step motor, if the cam 12 is in contact with the piston 17 and compresses the elastic element 21 during rotation 53, the rotor of the step motor is repelled in the inverse direction by the elastic force FE1 and induced voltage appears on the phases of the step motor M30. The acquisition circuit F40 captures the signal of induced voltage and the microcontroller U1 processes the captured signal to determine the position of the point Z1 corresponding to the start of the opening of the proportional hydraulic valve 20. In the event where the cam 12 is not yet in contact with the piston 17, the step motor M30 is not repelled and no induced voltage appears. In this case, the step motor is again powered to effect rotation 55 in the opposite direction of amplitude y to achieve recoil movement of the surface of the cam in the direction of negative movement 61. The angle of rotation 55 in the opposite direction is less than the angle of the rotation 53. The step motor is again powered to effect a second advancement rotation 53 of the rotor of the step motor by an angle equal to the preceding rotation 53 to achieve relative advancement in the direction of positive movement 59 equal to the difference in angle of rotation between the advancement rotation 53 and the recoil rotation 55 of the step motor. This process is repeated until induced voltage is detected, and the start point Z1 of the opening of the hydraulic valve 20 is determined.

After detection of the point Z1, the step motor M30 is then controlled to effect rapid movement 57 in the negative direction as far as the initial position which the step motor occupied at the start of the process of detecting the dead zone. The step motor is then controlled to effect rotation 53' to achieve movement of the surface of the cam 12 in the direction of the hydraulic valve 20', corresponding to negative movement 61, and then the current in the motor phases is cut. When the motor phase currents are cut, if the cam 12 is in contact with the piston 17' and has compressed the elastic element 21' during rotation 53', the rotor of the step motor is repelled in the inverse direction by the elastic force FE2 and induced voltage appears on one or more of the phases of the step motor M30. The acquisition circuit F40 captures the signal of induced voltage and the microcontroller U1 processes the captured signal to determine the position of the point Z2 corresponding to the start of the opening of the proportional hydraulic valve 20'. In the event where the cam 12 is not yet in contact with the piston 17', the step motor M30 is not repelled and no induced voltage appears. In this case, the motor is again powered to effect rotation 55' in the opposite direction to achieve movement of the surface of the cam in the direction of positive movement 61. The angle of rotation 55' in the opposite direction is less than the angle of rotation 53'. The motor is again powered to effect a second rotation 53' of the step motor by an angle equal to the preceding rotation 53' to achieve relative advancement in the direction of negative movement 61 equal to the difference in angle of rotation between the rotation 53' and the rotation 55' of the rotor of the step motor. This process is repeated until induced voltage is detected, and the start point Z2 of the opening 20 of the hydraulic valve 20' is determined.

The angle of rotation effected by the step motor between the point Z1 of the opening of the valve 20 and the point Z2 of the opening of the valve 20' is defined as being the clearance (dead zone) ZM of the actuation system 1. The origin O of the actuation system is determined as being half of the angle of rotation to be effected by the step motor between the start point Z1 and the start point Z2. The clearance (or dead zone) ZM and the origin O of the system can be stored in the memory of the microcontroller U1. The step motor can then be positioned at the origin O of the system with corresponding rapid movement 57'.

In the example illustrated in FIG. 2b, the movements of advancement rotation 53, 53' correspond to 6/4 pitch of the step motor, and the movements of recoil rotation 55, 55' correspond to 4/4 pitch of the step motor. In this case, the relative advancement movement of the rotor in the direction of positive movement 59 or negative movement 61 corresponds to 2/4 pitch of the step motor. This choice creates a signal of induced voltage of sufficient amplitude to ensure reliable detection of the limits of the dead zone with fine precision.

According to another form of the invention (not illustrated), the drive part 7 can comprise a piece or an elastic portion to enable detection of the limits of the clearance when the controlled element comprises no elastic part. The interest of this embodiment of the invention is that it enables detection of the clearance without the controlled element needing an elastic element, or avoids actuation of the controlled element during the detection process of the clearance. In this latter case, the piece or the elastic portion of the drive part 12 must have an elastic force weaker than the elastic force FE1 repelling the controlled element.

Figure 3:
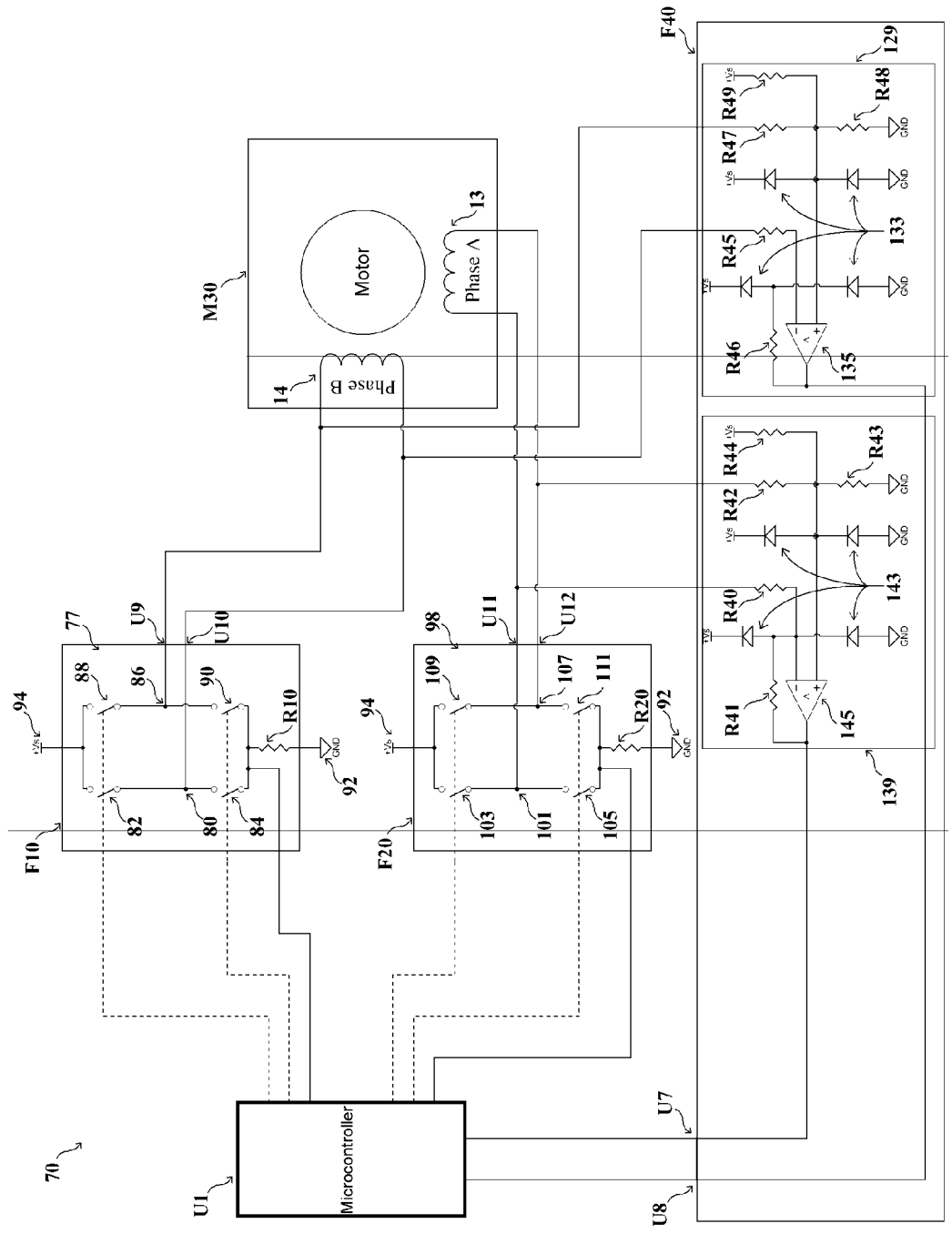
FIG. 3 is a sketch illustrating a circuit of a control unit of the actuation system, according to an embodiment of the invention.

With reference to the figures, especially FIGS. 1 and 3, according to an embodiment of the invention with a two-phase motor M30, comprising a control system 70, the control system can advantageously comprise a microcontroller U1, a first power circuit of phase B of the step motor F10, and a second power circuit of phase A of the step motor F20. In the example illustrated, the power circuit of phase B of step motor F10 comprises an H-shaped bridge circuit 77, and the power circuit of phase A of the step motor F20 comprises an H-shaped bridge circuit 98, but other power circuits known per se can be employed. The H-shaped bridge circuit 77 may comprise four power transistors 82, 84, 88, 90, advantageously transistors of MosFet type. The H-shaped bridge circuit 77 is connected on one side to the ground 92 and on the other side to the supply 94. The H-shaped bridge circuit 98 may comprise four power transistors 103, 105, 109, 111, advantageously transistors of MosFet type. The H-shaped bridge circuit 98 is connected on one side to the ground 92 and on the other side to the supply 94. Configuration of the H-shaped bridge circuit of the phases A and B of the step motor allows easy control of the step motor by allowing easy inversion of the polarities on the phases of the motor, and proportional control of the step motor.

With reference to the control system 70 illustrated in FIG. 3, the acquisition circuit F40 is an acquisition circuit of induced voltage and comprises a first circuit phase B 129 and a second circuit phase A 139. The first circuit phase B conducts differential measurement of induced voltage on phase B 14 of the step motor M30 between the terminal 80 of phase B1 and the terminal 86 of phase B2. The second circuit phase A conducts differential measurement of the induced voltage on phase A 13 of the step motor M30 between the terminal 101 of phase A1 and the terminal 107 of phase A2. The first circuit phase B amplifies the differential measurement of the induced voltage between the terminal of phase B1 and the terminal of phase B2 by means of a differential amplifier 135 so as to provide a signal of better quality to the microcontroller U1. The second circuit phase A amplifies the differential measurement of the induced voltage between the terminal of phase A1 and the terminal of phase A2 by means of a differential amplifier 145 so as to provide a signal of better quality to the microcontroller U1. With reference to the first circuit phase B 129, the overvoltage protection diodes 133 protect the inputs of the differential amplifier 135 against overvoltages originating from the power circuit of a step motor phase F10 during control of the step motor M30. With reference to the second circuit phase A 139, the overvoltage protection diodes 143 protect the inputs of the differential amplifier 145 against overvoltages originating from the power circuit of the step motor phase F20 during control of the step motor M30.

The resistors of the two differential amplifiers 135 and 145 can advantageously be fixed so that R40=R42=R45=R47, R41=R43=R46=R48, and R44=R49=∞ to define an amplification factor g equal to the ratio R41/R40, to define voltage at the terminal U7 equal to g times the difference in voltage between the terminal U12 and the terminal U11, and to define voltage at the terminal U8 equal to g times the difference in voltage between the terminal U9 and the terminal U10. The resistors R44 and R49 may advantageously have a resistance which is less than infinite ∞, creating offsetting of the zero point of the differential amplifiers and enabling measuring in a single polarity irrespective of the polarity of the induced voltage.

Referring to FIGS. 3, 4, 5 and 7, according to an embodiment of the invention, the method of acquisition of the voltage at the terminal U7 and at the terminal U8 by the microcontroller U1 comprises calculating the resulting electric angle and ascertaining a value corresponding to the angle of rotation by which the step motor M30 has been repelled. The electrical angle θe of the step motor is represented by the formula:

$$\theta e = a\tan(U_{ind}\text{ phase}A/U_{ind}\text{ phase }B)$$

where $U_{ind}$ represents the induced voltage

θm represents the mechanical angle of the rotor and is equal to $$\theta m = \theta e/Ne$$

where

Ne represents the number of electrical periods per revolution of the motor

Another more exact way of calculating the electrical angle θe of the step motor is represented by the formula:

$$\theta e = \text{sign}(\omega e)*(Ne/Kt)*\int \text{sqrt}(U_{ind}\text{phase}A\char`\^2 * U_{ind}\text{phase}B\char`\^2)dt$$

where

ωe represents the angular electric speed of the vectors of induced voltages, and Kt represents the torque factor of the motor.

Figure 4:
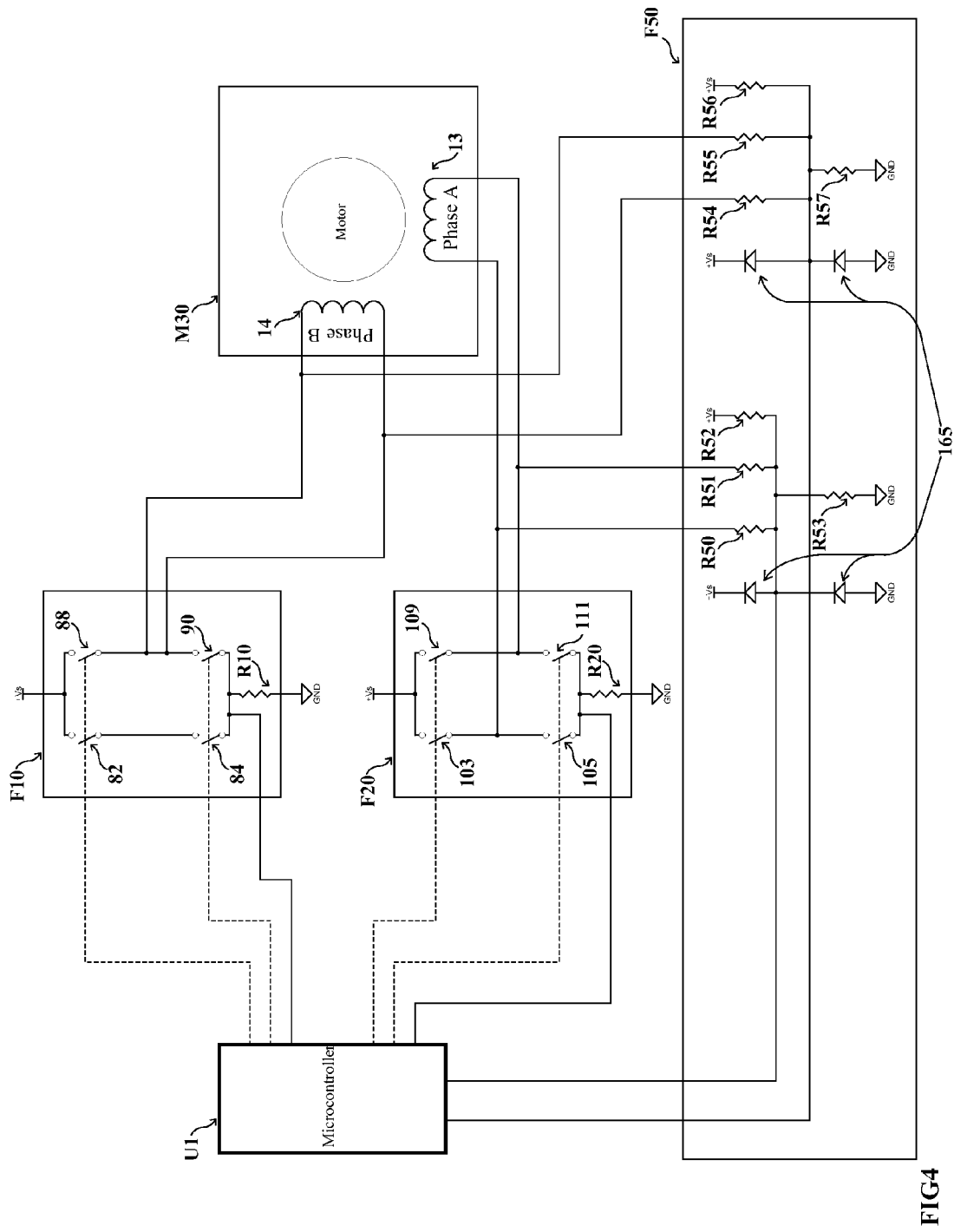
FIG. 4 is a sketch illustrating a circuit of a control unit of the actuation system, according to another embodiment of the invention.

Referring to FIG. 4, according to a variant, an acquisition circuit of the simplified induced voltage F50 comprises a set of overvoltage protection diodes 165 and a set of resistors R50 to R57 for defining a measurement ratio of the induced voltage on phase A 13 and phase B 14 of the step motor M30, and offsetting of the zero point to conduct measuring in a single polarity irrespective of the polarity of the induced voltage.

A method of measuring comprises switching off six of the eight transistors of the power supply circuits of the step motor phases, and maintaining one of the two transistors 84 or 90 and one of the transistors 105 or 111 in a state of conduction to determine the ground point of the induced voltage signal of each phase. The choice of the transistors that are left on in a state of conduction is established as a function of the chosen direction of the induced voltage.

When the resistors R50=R51=R54=R55=R52=R53=R56=R57, the measured voltages ($U_{mes}$) are the following:

$$U_{mes}(\text{phase }A) = Vs/4 + U_{ind}(\text{phase }A)*R52/4$$

$$U_{mes}(\text{phase }B) = Vs/4 + U_{ind}(\text{phase }B)*R52/4$$

Figure 5:
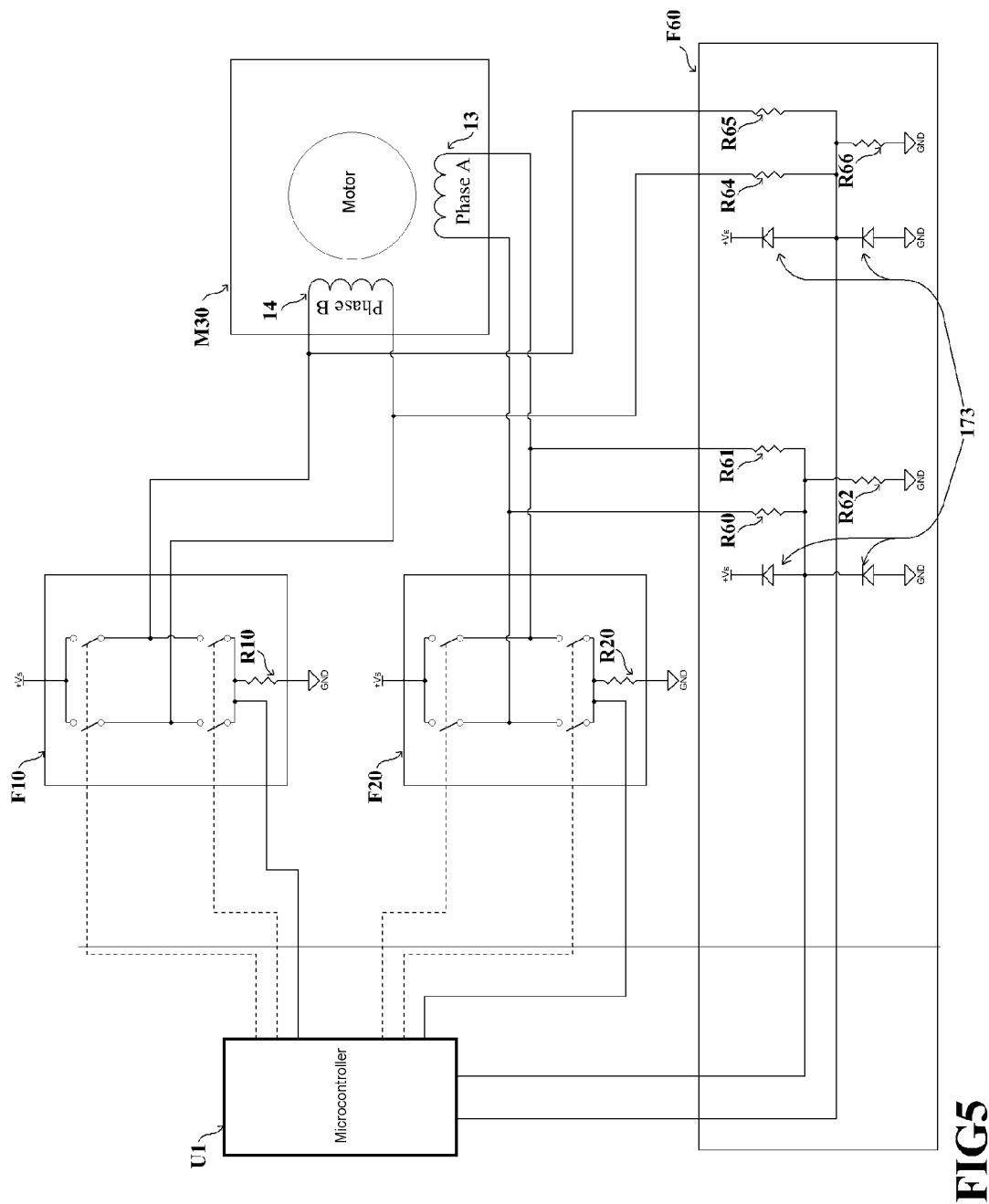
FIG. 5 is a sketch illustrating a circuit of a control unit of the actuation system, according to yet another embodiment of the invention.
Figure 6:
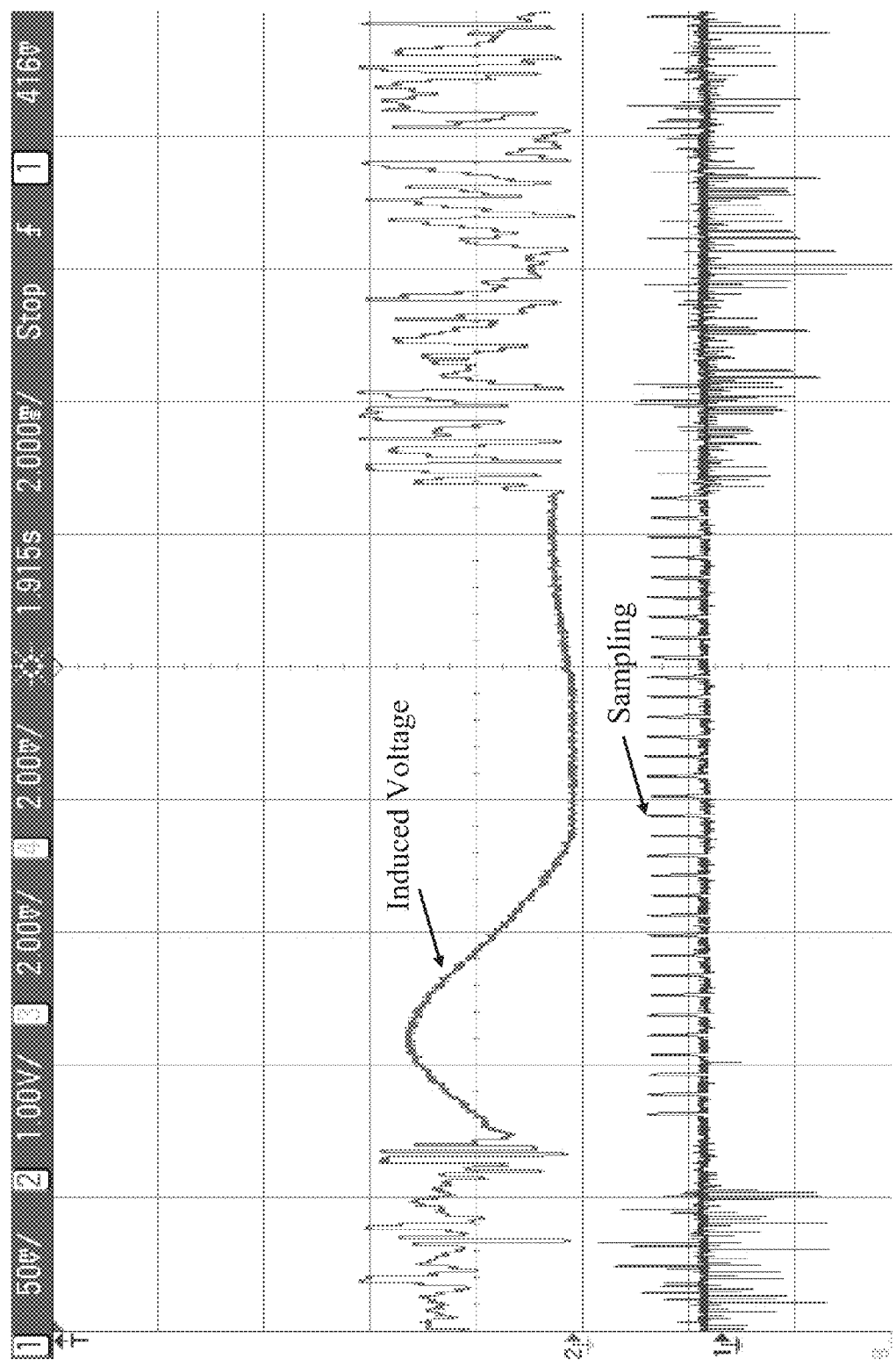
FIG. 6 is a view of a measuring equipment monitor illustrating an example of sampling of the induced voltage on a phase of a step motor of the actuation system according to an embodiment of the invention.

Referring to FIG. 5, according to another variant, an acquisition circuit of the simplified induced voltage without offsetting of the point 0 of the induced voltage F60, comprises a set of overvoltage protection diodes 173 and a set of resistors for defining a measurement ratio of the induced voltage on phase A 13 and phase B 14 of the step motor M30.

Referring to FIGS. 3, 4 and 5, another method of measuring the induced voltage is based on unidirectional measurement relative to ground. The method comprises switching off seven of the eight transistors of the power circuits of the step motor phases and keeping one of the transistors 84, 90, 105 or 111 in conduction to determine the point of ground of the induced voltage signal. The choice of the transistor 84, 90, 105 or 111 which is kept in conduction is ascertained as a function of the state of the phase currents prior to their being switched off. The resulting effect is to define on which phase of the motor and on which polarity the induced voltage is measured. The choice of the step motor phase on which measuring is conducted is effected to obtain an induced voltage of maximum amplitude when the step motor is repelled under the effect of the compressed elastic element. Detection of the induced voltage by the recoil of the step motor is based on a predefined amplitude being exceeded.

Another method comprises sampling the induced voltage on a phase of the motor and adding the measured values, thus forming the integral of the induced voltage, which represents the angle by which the step motor has been repelled.

Figure 7:
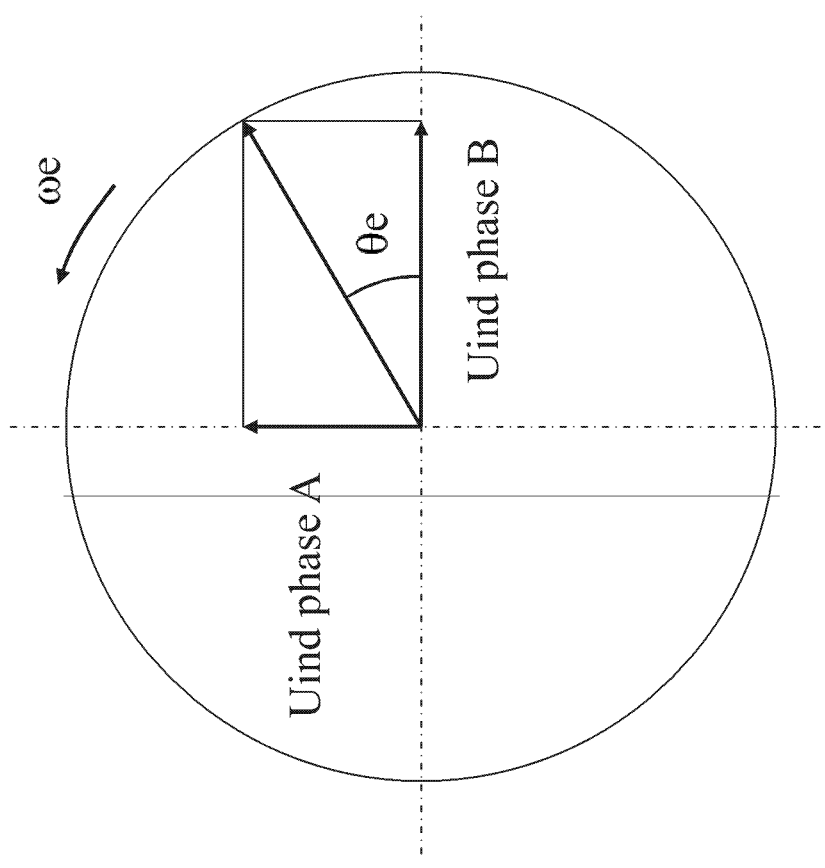
FIG. 7 illustrates the vectors of induced voltages of a two-phase step motor as well as the electric angle formed by the vectors of the latter according to an embodiment of the invention.

Referring to FIGS. 3 and 7, according to another form of the invention, another method of detection of the clearance or play of the drive chain of the actuation system comprises measuring the phase displacement between phase A and phase B of the step motor M30, by means of a phase displacement detection circuit F70 between phase A 13 and phase B 14 of the step motor.

The invention claimed is:

1. An actuation system control process for detection of mechanical clearance, the actuation system including:
   a control system;
   an actuator comprising a drive part and a step motor comprising a rotor and a stator with at least one electric phase;
   an actuated system comprising a controlled element coupled to the drive part; and
   an elastic part generating an elastic return force on the rotor of the motor or on the drive part,
   the detection process of mechanical clearance comprising the steps of:
   a) moving the rotor by a predetermined amplitude $x_i$ in a direction for displacement of the controlled element;
   b) switching off the current of said at least one phase of the stator;
   c) measuring an induced electric parameter generated on said at least one phase of the stator, and when the value of the electric parameter signals that the rotor has made no return or a return inferior to a predetermined threshold
   d) optionally, moving the rotor by an amplitude $y_i$ in an opposite direction to the direction for displacement of the controlled element, where $x_i > y_i$,
   e) and repetition of steps (a), (b), (c) and optionally (d) until detection of an induced electric parameter corresponding to return of the rotor resulting from the elastic return force when the mechanical clearance has been overtaken.

2. The control process of claim 1, wherein the stator has at least two electric phases and measuring the induced electric parameter comprises a differential measurement of the electric parameter between said at least two phases.

3. The control process claim 2, wherein the angle of rotation of return of the rotor is determined from the differential measurement of the electric parameter.

4. The control process of claim 1, wherein measuring the induced electric parameter comprises measuring the induced electric parameter of said at least one phase relative to a reference parameter.

5. The control process of claim 1, wherein the induced electric parameter measured is an induced voltage.

6. The control process of claim 1, wherein the amplitude $y_i$ of displacement of the rotor in the opposite direction is between 10 and 90% of the amplitude $x_i$ of displacement of the rotor in the direction for displacement of the controlled element.

7. The control process of claim 6, wherein the amplitude $y_i$ of displacement of the rotor in the opposite direction is between 30 and 70% of the amplitude $x_i$ of displacement of the rotor in the direction for displacement of the controlled element.

8. The control process of claim 1, wherein the amplitude $x_i$ of displacement of the rotor in the direction for displacement of the controlled element has a value between a tenth pitch (1/10 pitch) and two and a half pitch (2½ pitch) of the step motor.

9. The control process claim 8, wherein the amplitude $x_i$ of displacement of the rotor in the direction for displacement of the controlled element has a value between a quarter pitch (¼ pitch) and two pitch (2 pitch) of the step motor.

10. The control process of claim 9, wherein the amplitude $x_i$ of displacement of the rotor in the direction for displacement of the controlled element has a value between three quarters pitch (¾ pitch) and seven quarters pitch (¾ pitch) of the step motor.

11. An actuation system including a control system, an actuator comprising a drive part and a step motor comprising a rotor and a stator with at least one electric phase, an actuated system comprising a controlled element coupled to the drive part, and an elastic part capable of generating an elastic return force on the rotor of the motor or on the drive part, wherein the control system is configured for measuring an induced electric parameter on said at least one phase of the stator after switching off the current of said at least one phase of the stator to detect a return of the rotor resulting from the elastic return force when a mechanical clearance is overtaken.

12. The actuation system of claim 11, wherein the control system comprises a microcontroller, a power circuit of said at least one electric phase of step motor, and an acquisition circuit of said induced electric parameter.

13. The actuation system of claim 12, wherein the acquisition circuit comprises a differential amplifier connected to the terminals of said at least one phase.

14. The actuation system of claim 13, wherein the acquisition circuit comprises overvoltage protection diodes which protect the inputs of the differential amplifier against overvoltages originating from a power circuit of said electric phase of step motor during control of the step motor.

15. The actuation system of claim 11, wherein the acquisition circuit comprises a set of resistors for defining a measurement ratio of the induced voltage on said at least one electric phase, and offsetting of a zero point for conducting measuring in a single polarity irrespective of the polarity of the induced voltage.

16. The actuation system of claim 11, wherein the actuation system is a hydraulic control, the actuated system being a hydraulic valve device and the controlled element being a valve piston.

17. The actuation system of claim 11, wherein the control system is configured to execute the process as claimed in claim 1.

* * * * *